US006871226B1

(12) United States Patent
Ensley et al.

(10) Patent No.: US 6,871,226 B1
(45) Date of Patent: Mar. 22, 2005

(54) METHOD OF SEARCHING SERVERS IN A DISTRIBUTED NETWORK

(75) Inventors: Stephen J. Ensley, Tupelo, MS (US); David K. Haadsma, Tupelo, MS (US); Donald R. Kolenda, Jr., Tupelo, MS (US)

(73) Assignee: BSAFE Online, Tupelo, MS (US)

( * ) Notice: Subject to any disclaimer, the term of this patent is extended or adjusted under 35 U.S.C. 154(b) by 647 days.

(21) Appl. No.: 09/643,235

(22) Filed: Aug. 22, 2000

(51) Int. Cl.[7] ........................ G06F 15/173; G06F 15/16
(52) U.S. Cl. ..................... 709/224; 709/203; 709/242; 709/239
(58) Field of Search ................................ 709/224, 203, 709/242, 239

(56) References Cited

U.S. PATENT DOCUMENTS

| | | | | |
|---|---|---|---|---|
| 5,101,348 A | * | 3/1992 | Arrowood et al. | 709/242 |
| 5,542,047 A | | 7/1996 | Armstrong | |
| 5,596,723 A | | 1/1997 | Romohr | |
| 5,671,357 A | * | 9/1997 | Humblet et al. | 709/242 |
| 5,675,741 A | * | 10/1997 | Aggarwal et al. | 709/242 |
| 5,710,885 A | * | 1/1998 | Bondi | 709/224 |
| 5,764,913 A | | 6/1998 | Jancke et al. | |
| 5,787,252 A | * | 7/1998 | Schettler et al. | 709/224 |
| 5,835,720 A | * | 11/1998 | Nelson et al. | 709/224 |
| 5,935,210 A | | 8/1999 | Stark | |
| 5,961,597 A | | 10/1999 | Sapir et al. | |
| 6,031,528 A | | 2/2000 | Langfahl, Jr. | |
| 6,032,194 A | * | 2/2000 | Gai et al. | 709/239 |
| 6,101,528 A | * | 8/2000 | Butt | 709/203 |
| 6,292,838 B1 | * | 9/2001 | Nelson | 709/236 |
| 6,411,997 B1 | * | 6/2002 | Dawes et al. | 709/224 |
| 6,490,617 B1 | * | 12/2002 | Hemphill et al. | 709/223 |
| 6,574,664 B1 | * | 6/2003 | Liu et al. | 709/224 |
| 6,587,440 B1 | * | 7/2003 | Dawes | 370/255 |
| 6,636,499 B1 | * | 10/2003 | Dowling | 370/338 |

* cited by examiner

*Primary Examiner*—Hosain Alam
*Assistant Examiner*—Kevin Bates
(74) *Attorney, Agent, or Firm*—Howrey Simon Arnold & White, LLP; Michel J. Bell

(57) ABSTRACT

The present invention relates to methods of searching and querying computers and websites connected to a distributed network such as the Internet. When the computers and websites are uniquely identified by an IP address or similar identifier, the processes of the present invention systematically proceed through a given range of addresses to be queried in a top-to-bottom manner. The process preferably comprises four stages: the Initial Process, the Second Pass, the Ping Process, and the Ping Follow-Up. Essentially, the Initial Process establishes a preliminary listing of computers that respond to requests transmitted over the network. The Second Pass attempts to establish a connection to computers with which a connection could not be established during the Initial Process. The Ping Process uses ping commands to verify the operability of non-responsive computers; and the Ping Follow-Up makes one final attempt to transmit requests to computers that have responded to ping commands. Output files may be generated, based upon responses to the requests, that may be used in subsequent processes such as filtering Internet websites for content.

27 Claims, 4 Drawing Sheets

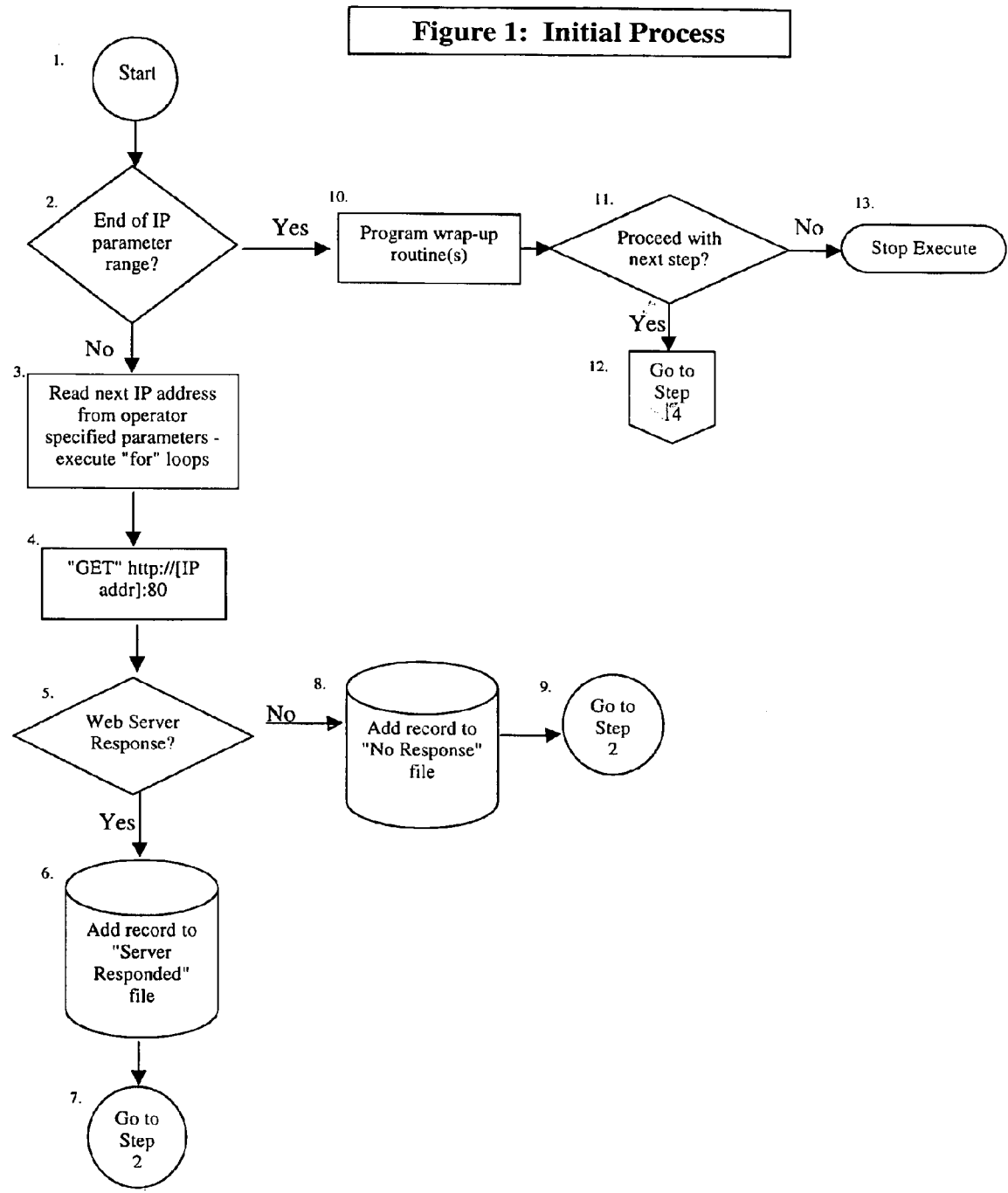

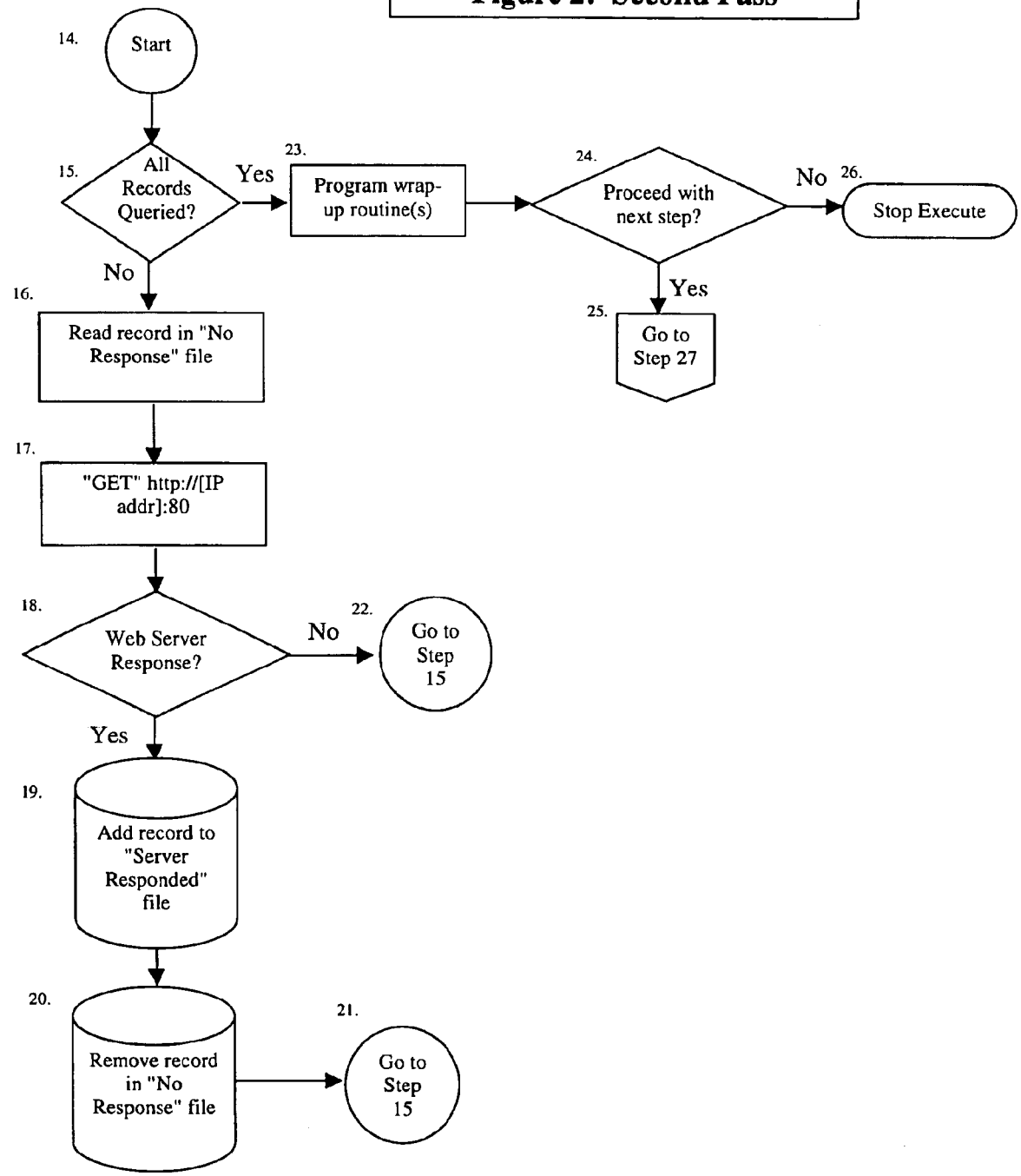

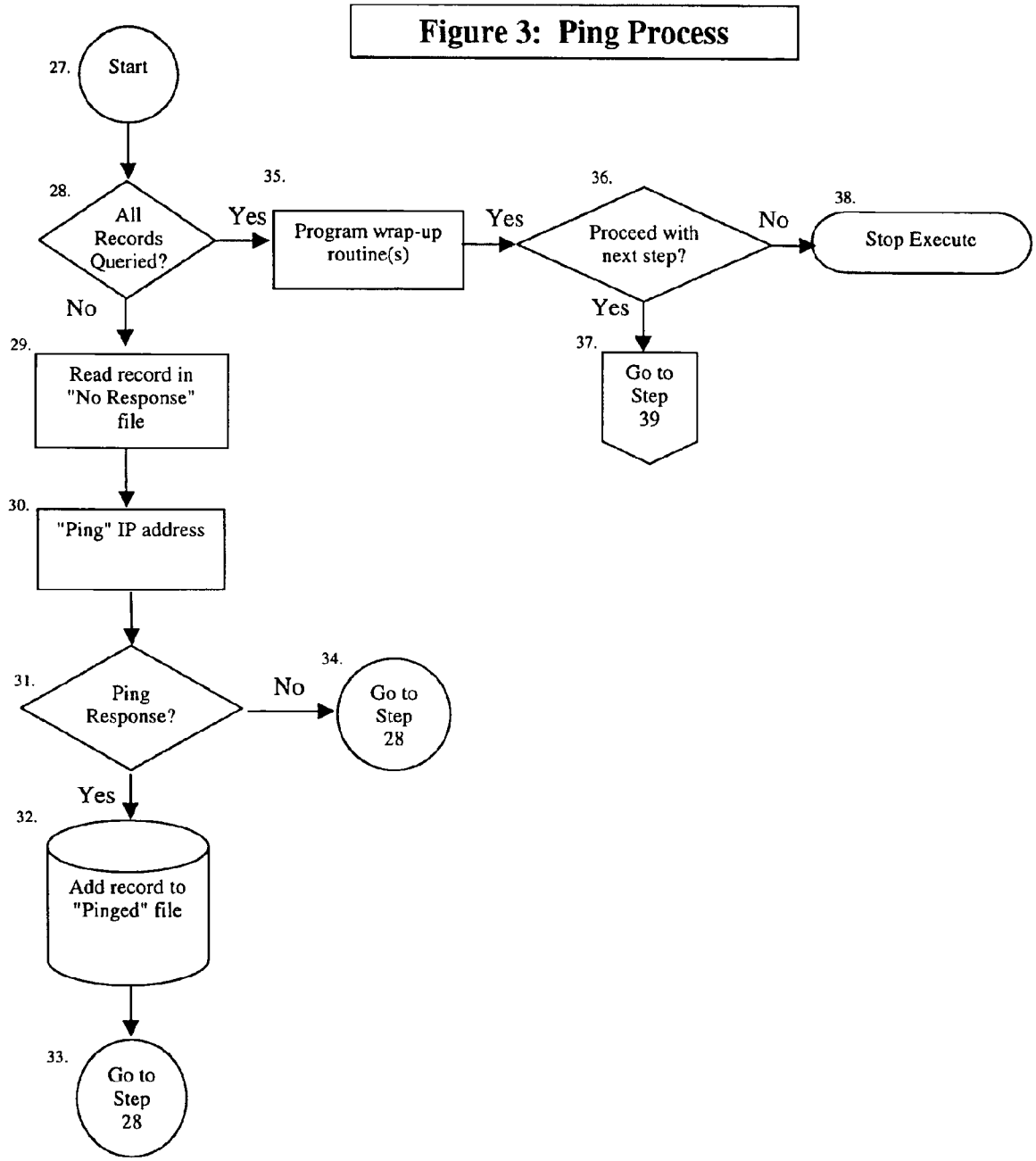

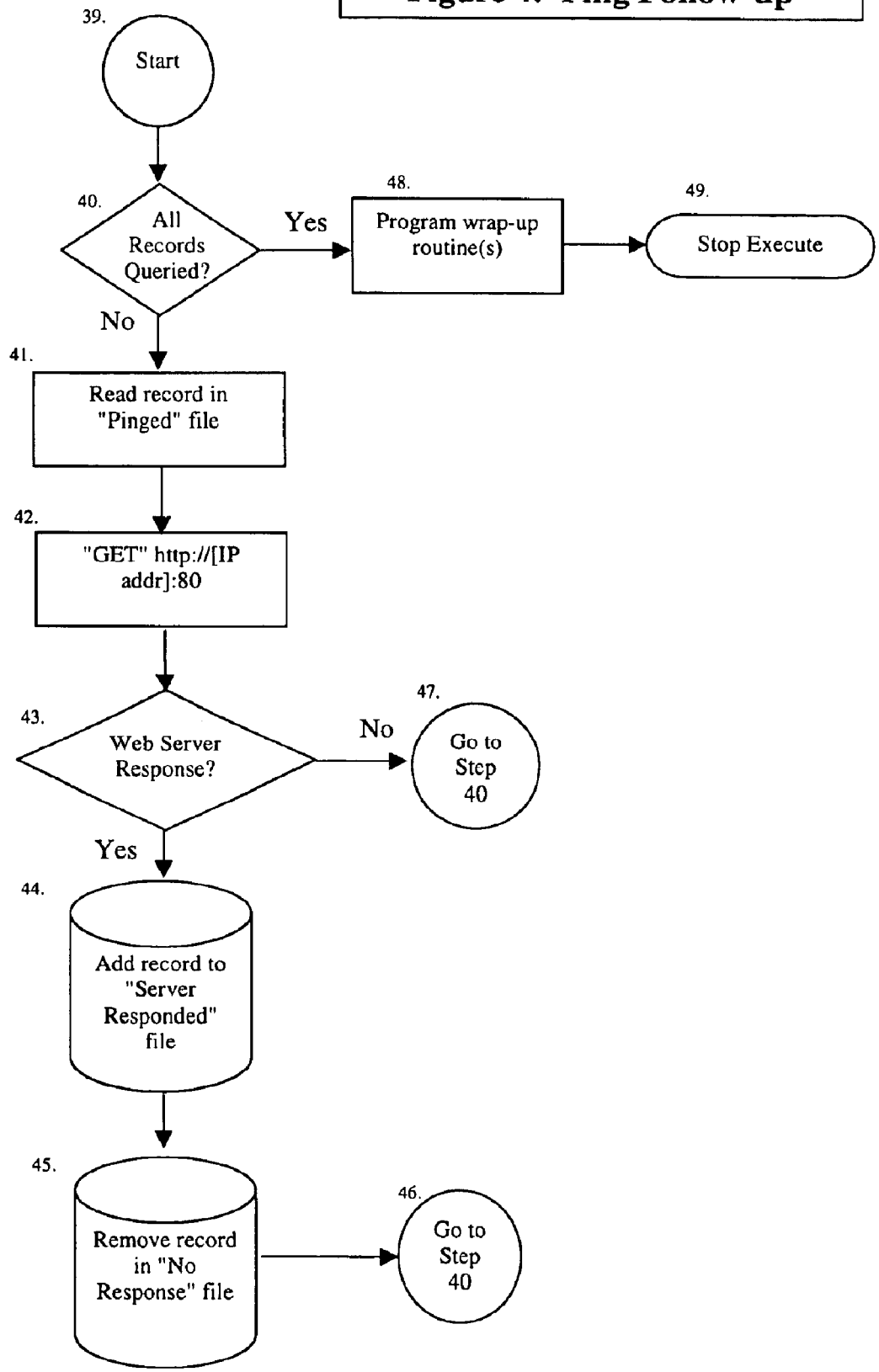

METHOD OF SEARCHING SERVERS IN A DISTRIBUTED NETWORK

BACKGROUND OF THE INVENTION

1. Field of the Invention

The present invention relates generally to searching and querying computers connected to a distributed network such as the Internet. More particularly, the invention relates to methods for searching servers, computers, and websites in a network that are identified by unique IP addresses.

2. Description of Related Art

The explosive growth of the Internet or "World Wide Web" in recent years has resulted in a tremendous amount of information becoming available to the public. Most commonly, the information that is made available at a website is commercial (i.e., merchants attempting to attract customers to their stores or "virtual stores"), informative (e.g., government websites and websites of certain organizations), or some combination of the two. A website exists by storing the information or content of the website on a server computer that is open to be accessed via the Internet. Every server that hosts content for the Internet is uniquely identifiable by an address, typically referred to as an Internet Protocol or "IP" address, that describes the "location" of that server on the Internet such that it can be found and accessed. Today, the volume of information accessible via the Internet is so vast that a user could not possibly find relevant items of interest without an effective searching mechanism, typically referred to as a search engine.

Traditional search engines employ one of two approaches. The first search technique involves periodic indexing of websites, as used by standard Internet search engine sites (portals such as AltaVista, Excite, and Yahoo!), or "meta-search" style sites (such as MetaCrawler, MetaSearch, and Ask Jeeves). The greatest disadvantage to using this search technique is that it is nearly impossible to accurately index even a large portion of the Internet. According to the NEC Research Institute, no single search engine indexes more than about 16 percent of the Internet. Moreover, this 16 percent excludes websites that are behind registration screens or authentication requirements. Furthermore, according to the same study, approximately 14 percent of the results returned by indexing search engines are invalid, indicating that the information that the search engines actually do index becomes outdated quickly with respect to the time required for the indexing process.

The second search method involves a software application (referred to as an "agent," "crawler," "robot," or "spider") that randomly wanders around the Internet following one random link after another, indexing and categorizing websites as they are encountered. While this method has the advantage that it is constantly working to explore the Internet, its random walking characteristic makes it difficult to employ in an organized or directed manner. Moreover, it still only succeeds in indexing a very small portion of the Internet.

In addition to poor coverage, both searching methods do a poor job of ascertaining content available on the Internet. The lack of effectiveness and accuracy of both methods creates a significant level of unreliability in developing mission-critical applications where content-based Internet searching is crucial to the success and integrity of the system application itself. For example, filters are a common type of network navigation tool, most commonly known in the context of the Internet, that often cooperate with searching tools. Since the Internet is almost completely unrestricted in the type of content that may be made available for widespread access and dissemination, filters are extremely valuable to those who wish to limit accessibility to personally objectionable material, such as parents of young children. Filters allow a user (e.g., the parent) to specify types of content that are unsuitable for viewing on the particular computer that is equipped with the filtering software. Filters function by screening websites before or as they are accessed and making a determination as to whether the content of a selected website should be displayed, in accordance with the conditions and parameters inputted into the filter. Since filters often work closely with search engines (either separate search engines or built-in search engines), it is critical to the filter's ability to accurately and completely screen offensive content that the filter have access to a reliable and comprehensive search engine.

Finally, many prior art search methods suffer from the additional disadvantage that they must be significantly modified as computer technology, and in particular network and Internet technology, evolve. For example, many existing search processes would have to be significantly reprogrammed if the current scheme of IP address numbering changed, as is being proposed in various circles. Also, there are a multitude of services that may be present within a distributed network such as the Internet. These services include, but are not limited to: Hypertext Transfer Protocol ("HTTP"); Hypertext Transfer Protocol, Secure ("HTTPS"); File Transfer Protocol ("FTP"); Simple Mail Transfer Protocol ("SMTP"); Network News Transfer Protocol ("NNTP"); User Datagram Protocol ("UDP"); Internet Relay Chat ("IRC"), and other application protocols/server ports running over Transmission Control Protocol/Internet Protocol (TCP/IP). Many prior art search techniques cannot accommodate all of these services. In addition, many prior art methods do not possess the flexibility to search specific ranges of addresses or exclude specified addresses.

Therefore, there is a need for an effective search process that can accurately and comprehensively search a large percentage of the Internet. Moreover, there is a need for a search process that is capable of performing its searching process within a relatively short period of time to avoid its results becoming prematurely obsolete and inaccurate. Additionally, there is a need for a search process that can be applied in a focused and directed manner, enables effective content-based filtering, is compatible with filtering tools, and provides significant flexibility to adapt as technology and user needs change. The present invention provides such a search engine for enabling a filter to perform its functions. In addition, the present invention is more flexible than prior art search processes in that it does not impose limitations on filters used in conjunction with the search process.

SUMMARY OF THE INVENTION

The present invention overcomes the disadvantages of prior art methods by systematically covering the entire range of numbers currently used for IP addresses (i.e., "0.0.0.0" through "255.255.255.255") to identify valid remote server computers hosting content accessible via the Internet or other distributed network. In addition, the present invention is capable of conforming to any future numbering scheme that may replace or supplement the current IP address numbering scheme, such as the proposed expanded IPv6 scheme.

The search and retrieval methodology of the present invention covers a range of IP addresses in a "top-tobottom" fashion that provides more comprehensive and accurate searching than any prior art method. The process may be continued until all IP addresses within a specified address range are covered, or until a specified time period has elapsed. Moreover, specific IP addresses or ranges may be excluded from searching to increase the search's efficiency. Additionally, the present invention is equally well suited to search any or all of the various network services that may be encountered in a large distributed network (e.g., http, ftp, etc.).

In essence, the present invention is a multi-tasking, multi-threaded utility that replicates the requests made by network navigation utilities, such as web browsers, to retrieve information contained on remote server computers. When the utility of the present invention encounters a remote server that responds to a certain request (e.g., an http request, ftp request, etc.) made by the local client computer performing the search, it writes the IP address of the responding server to an output file. The output file generated may then be used in a process of issuing requests and ping commands that ensures that the entire specified range of IP addresses is comprehensively and accurately queried. The output file generated may also be used as an input file to an ancillary process that examines the content located at the IP addresses.

The present invention may be run from a single ("local") client computer, or from numerous computers in tandem, with each computer being assigned a segment of the specified IP address range to be searched. The ability to execute the processes of the present invention in such a "client/server mode" ensures that the time required to effectively search will be significantly diminished over prior art methods. In addition, the process is not dependent upon a certain type of computer; any computing system that supports the Java™ Virtual Machine ("JVM") interpreter/compiler or equivalent TCP/EP programming language may take advantage of the processes of the present invention.

In one embodiment of the present invention, the search process involves identifying remote server computers with the express intent to discover, via a secondary search process, the content of the material these servers make available for display. In other words, the processes of the present invention may be used in concert with other well-known or novel search and filtering techniques employing the use of intelligent agents to classify and filter web content. These secondary search techniques could be employed to screen all types of web content including, but not limited to, text, still photographic images, audio clips, and streaming audio or video broadcasts. Another embodiment of the present invention locates remote server sites hosting morally objectionable or offensive content so that such websites can be blocked from access from a local computer.

The present invention thus provides new and significant advantages over the prior art. The present invention provides a more comprehensive and accurate searching methodology than prior art methods and is capable of performing its searching process within a relatively short period of time to avoid its results becoming prematurely obsolete and inaccurate. Moreover, the present invention enables effective content-based filtering, can be compatible with both well-known and novel filtering tools, and provides significant flexibility to adapt to new technology. Finally, the present invention provides user flexibility such as the ability to accommodate specific search ranges, time limitations, and various network services.

Other features and advantages of the present invention will become apparent from the following Detailed Description, claims, and Drawings.

BRIEF DESCRIPTION OF THE DRAWINGS

FIG. 1 is a flowchart of the Initial Process Stage of the preferred embodiment of the present invention.

FIG. 2 is a flowchart of the Second Pass Stage of the preferred embodiment of the present invention.

FIG. 3 is a flowchart of the Ping Process Stage of the preferred embodiment of the present invention.

FIG. 4 is a flowchart of the Ping Follow-Up Stage of the preferred embodiment of the present invention.

DETAILED DESCRIPTION OF THE PREFERRED EMBODIMENTS

Preferably, the methods of the present invention are "coded" into a software application using any of a large variety of computer programming languages such as Java™ which enable programmers to work with the standard TCP/IP protocol of large scale distributed networks such as the Internet. However, the methods of the present invention may also be used in the form of firmware, or may employ a programming language suited to another network protocol different from TCP/IP. Although TCP/IP is by far the most popular and common networking protocol, some local and wide area networks employ Internet Control Message Protocol (ICMP), Interior Gateway Protocol (IGP), Exterior Gateway Protocol (EGP), or Border Gateway Protocol (BGP). Consequently, the methods of the present invention may be coded in a language that comports with such alternative networking protocols.

In the preferred embodiment, a software program embodying the methods of the present invention is executed from the command prompt window on a local computer. Preferably, once the user initiates the program from the command prompt, a Java™ program runs in "single user mode" on the local machine. The term "single user mode," as used herein, refers to the executing of such a program embodying the searching methods of the present invention from a single computer. An alternative embodiment, referred to as "client/server mode," where multiple computers are used in tandem to execute multiple copies of the same software program simultaneously, will be discussed below.

It should be noted that the methods of the present invention are applicable to any distributed network including local area networks and wide area networks. The search techniques of the present invention can be used in any network in which component computers, devices, or websites are identifiable by unique, searchable addresses, such as an IP address. The preferred embodiment employs the search techniques of the present invention for searching servers connected to the Internet that host websites.

In the preferred embodiment, server computers are searched by their IP addresses. According to the current Internet Protocol (version 4), each computer on or connected to the Internet has a unique IP address that identifies the location of the computer. An IP address is a 32-bit number that is typically written in the form n1.n2.n3.n4, where n1, n2, n3, and n4 (known as the primary number, secondary number, third block, and fourth block, respectively) each represent an 8-bit number between 0 and 255. Therefore, the entire range of IP addresses under this standard is 0.0.0.0 to 255.255.255.255.

To initiate communications with another computer over a TCP/IP network, a computer opens a port in its interface to receive a TCP data stream. The initiating computer sends messages in TCP/IP protocol format that have defined fields for its IP address and for the recipient computer's IP address (i.e., the computer which the initiating computer is attempting to access). The present invention is not necessarily limited to this numbering scheme for IP addresses. Version 6 of the Internet Protocol (the so-called, IPv6 or IPng, for Internet Protocol next generation) is expected to have 128-bit addresses, with one address for each interface, and with different types of addresses. The methods of the present invention are flexible enough to adapt to the IPv6 numbering scheme, as well as any other future numbering scheme.

In the preferred embodiment, the operator executing the program, whether in single-user or client/server mode, specifies the IP address range that the process will search. A beginning IP address is required. If no ending IP address is specified, the process may default to the end of the numbering sequence for the high-order number to be searched. For example, if the beginning IP address is 208.0.0.0, the default ending IP address may be 208.255.255.255. Of course, default ending IP addresses are simply a matter of choice for the programmer. The default ending IP address could just as easily be 255.255.255.255 or any other number. In addition, the program could be written such that, if the ending IP address input by the user is before the beginning IP address (e.g., 207.0.0.0), the program will accommodate this and simply reverse the order of searching (i.e., search from 208.0.0.0 to 207.0.0.0) or automatically swap the beginning and ending IP addresses, resulting in a search from 207.0.0.0 to 208.0.0.0.

In the preferred embodiment, certain addresses may be specifically excluded from any range of addresses to be searched. For example, there are ranges of IP addresses that are reserved for private networks (currently, 10.0.0.0 through 10.255.255.255, 172.16.0.0 through 172.31.255.255, and 192.168.0.0 through 192.168.255.255). These addresses, as well as certain other addresses (such as governmental sites) are not open to general Internet requests. Therefore, such addresses may be automatically excluded from the process of the preferred embodiment. The "Loopback" exclusion—IP address 127.0.0.1 is reserved to test the local machine ("local host"), and preferably is not tested as part of this process (the IP address 127.0.0.1 enables a host to send a message to itself). In addition, a program implementing the processes of the present invention may provide the user with the ability to specify other addresses that are to be excluded, either as a matter of regular course, or for individual searches.

Preferably, the process also allows for user intervention, permitting the process to be paused and continued at a later time, or stopped and re-started at a later time. In addition, the program may permit the user to specify a time range in which searching is to be performed, whereupon the searching process would cease or pause at the expiration of the specified time. Similarly, the program may permit the user to input a specified ending time, whereupon the program would cease or pause searching until reinitiated by the user. In either time constraint scenario, the program may be written to cease or pause searching upon expiration of the allotted time regardless of whether the entire range of IP addresses has been searched. Such abilities allow the method of the preferred embodiment to be more user-friendly than prior art searching methods.

Preferably, the process comprises four stages: the Initial Process, the Second Pass, the Ping Process, and the Ping Follow-Up. Each of these stages is discussed in detail below. Based upon the user's specified parameters, the program may automatically step through each of the four processes without user intervention, or may terminate or pause after each stage, postponing the remainder of the steps until the user resumes the job at a later time. Preferably, the entire process is repeated periodically in its entirety (e.g., every thirty days), to stay as current as possible with the rapidly changing Internet landscape.

The Initial Process

Referring now to FIG. 1, the process is initiated in step 1. As stated above, in the preferred embodiment, the process is initiated by the user entering the appropriate Start command at a command prompt. The program must be provided with a range of IP addresses to search. This range may be user specified, programmed in by default, or some combination of the two. Preferably, a beginning IP address is required and the program will display an error message if this is not entered. An ending IP address may also be input by the user; however, this may be optional. Preferably, if no ending IP address is specified, the program, by default, will proceed until it has searched all of the IP addresses (barring any excluded addresses) within the primary number block. Thus, for example, if a beginning IP address of 208.0.0.0 is input and no ending address is specified, the program would automatically search all of the IP addresses from 208.0.0.0 through 208.255.255.255. Of course, the default ending IP address, as well as the decision to employ a default ending IP address, are a matter of choice. In FIG. 1, step 2 represents that portion of the process that checks whether the ending IP address, whether specified or default, has been reached. Assuming the program has not yet reached the end of the IP address range to be searched, the program proceeds to step 3 in which the next IP address in the range is searched.

Preferably, the initial program comprises a series of nested "For" loops. They are nested so that each section of numbers that comprise an IP address is incremented such that all of the numbers within the address range have the main program logic applied to them. Depending upon the specific programming language used, code may not be written exactly as nested "For" loops, but rather as some substantial equivalent capable of executing the iterative techniques described below.

Instead of incrementing from the lowest-ordered numbers first (i.e., beginning with the fourth block) and then increasing the next-highest in succession as prior art methods do, the process of the present invention first increments the numbers in the second-highest range (the secondary number), then increments the numbers in the third block, then the fourth block, and if necessary, ending with the primary number. This is the reverse of the techniques employed by sequential search mechanisms and is, in fact, contrary to conventional search engine wisdom.

As an example, if the IP address range to be searched is 208.0.0.0 through 208.255.255.255, the process may iterate through the range as follows:

TABLE 1

| | | | |
|---|---|---|---|
| 208.000.000.000 | 208.000.001.000 | 208.000.002.000 | 208.000.255.000 |
| 208.001.000.000 | 208.001.001.000 | 208.001.002.000 | 208.001.255.000 |
| 208.002.000.000 | 208.002.001.000 | 208.002.002.000 | 208.002.255.000 |
| 208.003.000.000 | 208.003.001.000 | 208.003.002.000 ..... | 208.003.255.000 |
| : | : | : | : |
| 208.255.000.000 | 208.255.001.000 | 208.255.002.000 | 208.255.255.000 |
| | | | |
| 208.000.000.001 | 208.000.001.001 | 208.000.002.001 | 208.000.255.001 |
| 208.001.000.001 | 208.001.001.001 | 208.001.002.001 | 208.001.255.001 |
| 208.002.000.001 | 208.002.001.001 | 208.002.002.001 ..... | 208.002.255.001 |
| 208.003.000.001 | 208.003.001.001 | 208.003.002.001 | 208.003.255.001 |
| : | : | : | : |
| 208.255.000.001 | 208.255.001.001 | 208.255.002.001 | 208.255.255.001 |
| | | | |
| 208.000.000.255 | 208.000.001.255 | 208.000.002.255 | 208.000.255.255 |
| 208.001.000.255 | 208.001.001.255 | 208.001.002.255 | 208.001.255.255 |
| 208.002.000.255 | 208.002.001.255 | 208.002.002.255 ..... | 208.002.255.255 |
| 208.003.000.255 | 208.003.001.255 | 208.003.002.255 | 208.003.255.255 |
| : | : | : | : |
| 208.255.000.255 | 208.255.001.255 | 208.255.002.255 | 208.255.255.255 |

As shown in Table 1, the secondary number is incremented from 0 to 255 for each third block number, and the third block number is incremented from 0 to 255 for each fourth block number. First, the program increments the secondary number from 0 to 255 for a third block number of 0 and a fourth block number of 0. Next, the third block number is incremented from 0 to 1 and again the secondary number is incremented from 0 to 255, while the fourth block number remains at 0. This process is repeated until the entire range of third block numbers (i.e., 0 to 255) has been cycled through. Not until the entire range of third block numbers has been cycled through is the fourth block number incremented from 0 to 1. The procedure is then repeated for a fourth block number equal to 1 and is subsequently repeated until the entire range of fourth block numbers has been queried.

This procedure is preferably performed while maintaining the primary number constant. For an address range extending over multiple primary numbers (e.g., 208.0.0.0 to 220.0.0.0), the primary number would be incremented as a fourth step. In other words, after reaching 208.255.255.255, as shown in Table 1, that process would be repeated using 209 as the primary number rather than 208. This iterative process could then be repeated until the ending IP address of 220.0.0.0 is reached.

An example of a software routine written in Java™ that could produce such a result is as follows:

```
// starting main for loop-IP group 1 . . .
    for (int i1=ipArray[0];i1==ipArray[0];i1++) {
        if (firstTimeIp4==false) ipArray[3]=0;
        for (int i4=ipArray[3];i4<255;i4++) {
            if (i4==254) firstTimeIp4=false;
                if (firstTimeIp3==false) ipArray[2]=0;
    for (int i3=ipArray[2];i3<256;i3++) {
        if (i3==255) firstTimeIp3=false;
            if (firstTimeIp2==false) ipArray[1]=0;
            for (int i2=ipArray[1];i2<256;i2++) {
                if (i2==255) firstTimeIp2=false;
    //increment the display counter . . .
        ipCounter++;
```

In this example, the primary number ("208") is the value in the variable ipArray[0], ipArray[1] is the secondary number, ipArray[2] is the third block number, and ipArray[3] is the fourth block number.

Each time the process increments to the next address in the range, a request is transmitted to that address to see if a server will respond. This step is identified as step 4 in FIG. 1. As stated above, the process may issue any of a wide variety of network service requests. These requests include, but are not limited to: Hypertext Transfer Protocol ("HTTP"); Hypertext Transfer Protocol, Secure ("HTTPS"); File Transfer Protocol ("FTP"); Simple Mail Transfer Protocol ("SMTP"); Network News Transfer Protocol ("NNTP"); User Datagram Protocol ("UDP"); Internet Relay Chat ("IRC"), and other application protocols/services running over TCP/IP. Moreover, alternative requests can be used when the processes of the invention are employed in a network environment that utilizes a networking protocol different from TCP/IP, such as ICMP, IGP, EGP, or BGP.

In an alternative embodiment of the present invention, results of the current request may, depending upon operator preferences, be transmitted to a display, file, or other means for displaying and/or recording results and status of an issued request, 4. Such a step may include displaying (e.g., on a monitor) the status of an issued request (e.g., "pending," "transmitting," "awaiting response," etc.), or the results of an issued request (e.g., "positive response received" or "no response received"). Such status and response indications may be recorded to a file of any format in addition to or instead of being displayed.

A request is sent to each WP address before the process increments to the next. Preferably, the process does not increment to the next address until a response is received from the queried computer (FIG. 1, step 5). However, since some computers will not respond for various reasons (e.g., they are not connected to the Internet at the moment, they are closed to new requests, or they are not permitted for security reasons to accept requests and/or respond to requests), it may be desirable to impose a standard time in which to await a response. In such an embodiment, if no response is received within the allotted time, the process "times out" and proceeds to the next step.

In another embodiment of the present invention, the process is performed by several separate but related modules. In this embodiment, one module iterates through the IP addresses in the range, transmitting the requests to each address; while another module awaits the responses. Thus, any delays in receiving responses would not affect the time required to cycle through the entire range of addresses to be queried.

Computers communicate with the Internet through an interface that typically has a number of ports. By convention, certain default ports are associated with certain protocols. For example, http:// communications are typically transmitted through a port numbered "80". In the transmitted message, however, the user can specify another port that is different from the default port. Moreover, multiple ports may be used for one protocol, and conversely, one port could be used for multiple protocols. Thus, each TCP data stream associated with an EP address passes through a port (e.g., port 80) in the computer performing the search. Thus, step 4 indicates, as an example, a "GET" command for an http request that includes the specified IP address and port number.

When the program finds a web server responding to a request (step 5), it creates a record in an output file (step 6). The output file may be created at a number of points with respect to the searching process. For example, the output file may exist prior to initiating the search process (i.e., prior to step 1). Alternatively, the output file may be created at the point the first record is written to the file (i.e., the first time steps 5, 6, or 8 are executed).

The output file may be located on any type of storage medium such as a hard disk, CD, or tape, and the storage device may be local to the computer performing the search or remotely connected via a network. The file may be any of a wide variety of well-known file formats. In the preferred embodiment, the output file is a table, such as a relational database, and each record is a row in the table corresponding to each queried IP address. However, the output file may be in any useful format such as a text file (".txt") format, Hypertext Markup Language ("HTML") format, comma separated values ("csv") format, electronic spreadsheet format (e.g. ".wk1", ".wks", ".qp1," etc.), Adobe™ "pdf" format, or any database or similarly useful format. Those knowledgeable in the art will understand the procedures required to work with each of these specified file formats, converting files between the various formats, as well as other similarly suitable formats.

In the preferred embodiment, as indicated by steps 5, 6, and 8 in FIG. 1, if a server responds to a request, a record corresponding to that address is written to a "Server Responded" output file (step 6) that contains entries from which a response was received. If no response is received, a record corresponding to that address is written to a "No Response" output file (step 8). Of course, the "Server Responded" and "No Response" files need not necessarily be named as such. They also need not be separate files; they could comprise different sections of a single file, separate tables within a single file or workbook, or any other similarly useful configuration.

Alternatively, the addresses may simply be recorded within a single file with a notation as to whether a response was received or not, such that "positive responses" and "no responses" can be sorted and grouped as necessary.

As to the individual records created within each output file, the records preferably are in the form of rows inserted into the output files, which are tables. However, the records can be in any form suitable to the file format employed. Additionally, each record preferably contains at least the address queried. The records may also contain other useful information such as, but not limited to, the date and time of the last query, the delay in receiving a response from the queried computer (which is an indication of the speed of the connection between the two computers and may be used for prioritizing subsequent searches), and other characteristics of the query that may reflect the computer located at that address or the connection.

In an alternative embodiment, arrangements could be made within the process of the present invention to accommodate negative acknowledgments; that is, messages in response to a request that indicate that the queried computer is present but not receptive to requests. Negative acknowledgment messages could be recorded in a third and separate output file, or as part of a single output file, as described above.

The initial process preferably continues until all of the addresses in the specified range have been queried (see FIG. 1, steps 2, 7, and 9). Once all of the addresses within the specified range have been queried (step 2), the program may perform a clean-up process (step 10) and proceed to the next stage (step 12) or terminate (step 13). Preferably, the clean-up process involves, at least in part, freeing memory of any Java objects that are no longer used. This, to some extent, is performed automatically by the Java™ Virtual Machine, which periodically and automatically runs a "Garbage Collector" routine. Any output tables or files created as a temporary data repository are deleted from storage, wherever present (e.g., a fixed disk drive, CD, floppy disk, zip disk, or active RAM). The clean-up of step 10 may also include a final "save results to file" process (e.g., a "Commit" SQL statement). Finally, the clean-up process may display some "End of Job" ("EOJ") process statistics, such as the number of addresses queried by the various processes (i.e., the Initial Pass, Second Pass, etc.), the number of addresses with responses versus the number of addresses that did not respond, and errors during processing. EOJ statistics may then be displayed to the operator and/or saved to a file. Clean-up processes may be performed at the end of individual stages of the overall process or at the end of the overall process; or they may be skipped altogether.

Alternatively to terminating (step 13), the user may input a parameter that directs the program to proceed directly to the Second Pass (steps 11 and 12). Otherwise, the remaining stages of the process may be delayed and resumed at a later time, such as if the user directs the program to stop after the Initial Process, or if the user inputs a specified time limit for executing the Initial Process.

The Second Pass

Referring now to FIG. 2, the second stage of the process of the preferred embodiment is the Second Pass. The Second Pass may be performed automatically following conclusion of the Initial Process, or it may be performed at another time. Consequently, the Start step for the Second Pass (step 14) represents either an automatic start following step 12 in FIG. 1, or a user-commanded start.

In the Second Pass, the No Response output file created during the Initial Process (FIG. 1, step 8) is read (FIG. 2, step 16). The logic behind the Second Pass is generally that the Initial Process attempts to find as many operative sites in the shortest possible time, while the Second Pass increases accuracy of the results. In testing, the inventors have been found that a server preferably should be allowed 100 milliseconds (ms) to respond. Imposing a 100 ms wait in a program implementing the process of the preferred embodiment increases the accuracy of the search results. More, less, or no delay may be included within the process, depending upon individual requirements. However, it has been found that if the wait time is less than 100 ms, servers may not have adequate time to respond. On the other hand, if the wait time is greater than 100 ms, the search process is unnecessarily slowed, reducing the efficiency of the process. Therefore, the Second Pass seeks to connect to operative servers that may have been temporarily inoperative, overloaded with traffic, or unable to respond for some other reason.

As indicated in FIG. 2, the Second Pass process involves iterating through the IP addresses recorded in the No Response output file (step 16) and sending to each address in turn, a request similar to that sent during the Initial Process (step 17). If a server responds to a request (steps 18 and 19), the address is added to the Server Responded output file (step 19), and removed from the No Response output file (step 20). If the server again fails to respond in response to step 17, the address remains in the No Response file (steps 18 and 22). As stated above with respect to the Initial Process, the programming may provide status and/or response indications with respect to the issued requests, 17, to be displayed and/or recorded.

The Second Pass process preferably continues until all of the addresses in the No Response file have been read (step 15). As with the Initial Process, however, a time limitation may be imposed by the user to limit the Second Pass to a definitive time. Also as with the Initial Process, the program may perform a clean-up process and terminate (steps 23 and 26) for the user to resume at a later time if desired; or the procedure may automatically proceed to the third stage, the Ping Process (steps 24 and 25).

The Ping Process

Referring now to FIG. 3, the third stage of the process of the present invention is the Ping Process. The Ping Process may be performed automatically following conclusion of the Second Pass, or it may be performed at another time. Consequently, the Start step for the Ping Process (step 27) represents either an automatic start following step 25 in FIG. 2, or a user-commanded start. In an alternative embodiment of the invention, the Second Pass may be skipped in its entirety and the process may comprise proceeding from the Initial Process directly to the Ping Process. This sequence could involve proceeding automatically from the Initial Process to the Ping Process (i.e., from FIG. 1, step 12 to FIG. 3, step 27), or the user may initiate the Ping Process (step 27) following a termination of the Initial Process (step 13), where the termination was user-commanded or the result of a time limitation. The overall accuracy of the process, however, may be less if the Second Pass is skipped.

The Ping Process generally involves reading the addresses that remain in the No Response output file, transmitting a ping command to each address in turn, and modifying the output files if necessary to reflect the results. If a server does not respond to requests during both the Initial Process and the Second Pass, the address associated with that server should still be listed within the No Response output file. Preferably, IP addresses within the No Response file are read sequentially (step 29) and issued ping commands (step 30). If a response is received from the pinged server, the address is added to a "Pinged" output file (step 32). As stated above with respect to the Initial Process, the programming may provide status and/or response indications with respect to the ping commands, 30, to be displayed and/or recorded.

Preferably, the address is not removed from the No Response file at this point since the address has not responded to an actual service request. As with the Server Responded and No Response output files, the Pinged file may be created at the moment in the process that it is first required, or it may previously exist. Similarly, the Pinged file may be part of either the Server Responded or the No Response files, or both.

If a response to the ping command is received (indicated by the "Yes" line extending from step 31 to step 32), this means that the server identified with that IP address is operative, but not receptive to the type of request transmitted (i.e., the http request, ftp request, etc.). If no response to the ping command is received (steps 31 and 34), then most likely, the computer located at that address is inoperative, completely unreceptive, or disconnected.

As with the Second Pass, the Ping Process preferably continues until all of the IP addresses remaining in the No Response file have been read (step 28). The process may perform ID; a clean-up routine (step 35), continue to the next stage—the Ping Follow-Up stage (steps 36 and 37)—or it may simply terminate (step 38) to be resumed at a later time.

The Ping Follow-Up

Referring now to FIG. 4, the fourth stage of the process of the preferred embodiment is the Ping Follow-Up. The Ping Follow-Up may be performed automatically following conclusion of the Ping Process, or it may be performed at another time. Consequently, the Start step for the Ping Follow-Up (step 39) represents either an automatic start following step 37 in FIG. 3, or a user-commanded start.

Essentially, the Ping Follow-Up process comprises reading the addresses recorded in the Pinged output file, issuing a request similar to that transmitted in the Initial Process and the Second Pass to each address, and modifying the appropriate output file if necessary. At this point in the overall process, the Ping Process has proven the existence of a server at the address, but not necessarily one open to the type of request being transmitted. This concluding pass at the addresses (step 42) makes one final attempt to determine whether the server is receptive to requests. Again, as stated above with respect to the Initial Process, the programming may provide status and/or response indications with respect to the issued request, 42, to be displayed and/or recorded.

As indicated in FIG. 4, step 41 involves reading the IP address within the Pinged file, preferably sequentially. If an address responds to a request of the type transmitted in the Initial Process and Second Pass (steps 42, 43), the address is added to the Server Responded output file generated during the Initial Process (step 44). In addition, the address is removed from the No Response output file, step 45. If no response is received (steps 43, 47), no amendment is made to any output file, the address remains in the Pinged and No Response files and the procedure is repeated for the next IP address in the Pinged file (step 47). The Ping Follow-Up process continues until all of the IP addresses within the Pinged file have been read (step 40), at which point the program may perform certain clean-up routines, as detailed above, and terminate (steps 48 and 49).

Client/Server Mode

In an alternative embodiment of the present invention, the processes detailed above may be performed in a "client/server mode," that basically involves executing the processes simultaneously from a plurality of computers operating in tandem. In this embodiment, the user copies the program implementing the processes of the invention to a number of computers that are connected to the user's computer ("the client computer"), preferably via a network such as the Internet.

Once the program has been installed on other computers ("the servers"), the user issues the start command to initiate the process via the network. The software program embodying the methods of the present invention is executed via the network by preferably operating a Java™ "Servlet" to make multiple requests by numerous computers all running their own copies of the same program. Those skilled in the art will understand the procedure to operate in client/server mode over a network using Java™ Servlets or other methods. In client/server mode, each computer may be employed to examine a different segment of the address range to be searched.

The processes operating in client/server mode are similar to those employed in single-user mode (as detailed above) with only slight differences. For example, the output files employed are preferably tables in a database that is accessible from each computer so that each computer may operate with the necessary output files without having to interact with the user's computer, thereby slowing down the process. The type of database used may vary as performance needs dictate, as may the table structure and entity relationships within the database. Preferably, in order to ensure compatibility, the database will follow ANSI/ISO SQL standards. Thus, the program may involve inserting a row corresponding to each queried address into a table in a database that is the appropriate output file.

Also as part of the client/server embodiment, the user's computer may monitor the status of each remote computer to ensure that each remote computer is effectively performing its assigned tasks. In practice, it has been discovered that the process operates optimally at the rate of approximately five IP addresses per second. In order to repeat the process every thirty days (as is recommended to ensure accuracy), numerous computers can be employed in client/server mode to run multiple copies of the same program simultaneously.

Further as part of the client/server embodiment, programming may work in conjunction with the database to manage files, record locking or permission controls, and perform other functions required to read and/or write data to an output file.

Use With Filtering Software

Once the above described processes have been completed and the resulting output files have been created, the output files may be used in a secondary search process to evaluate the content being stored on servers. For example, in the context of a filter for use with browsing the Internet, a secondary process may be employed to search the IP addresses in the Server Responded output file to evaluate the websites hosted by those servers for specific content. As a result, websites could be searched, for example, for morally objectionable content, in a more efficient manner than prior art methods because only active web servers are listed in the Server Responded file. The filtering process employed may be well-known or novel. Moreover, the website content screened may include any of text, still images, and audio or video clips, including, for example, interactive vector graphics formats.

However, as stated above, the present invention is not limited to Internet websites or http-type requests. The present invention, whether operating in single-user or client/server mode, may be applied to other services such as ftp, smtp, udb, etc., as detailed above. This includes applications involving filters. As those skilled in the art are aware, filters may be applied to all such services as well.

CONCLUSION

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A method of querying computers connected to a distributed network, said method comprising the steps of:

providing a range of Internet Protocol ("IP") addresses to be queried, said range being defined by a beginning address and an ending address;

selecting an IP address to be queried from the range of Internet Protocol ("IP") addresses, the selected IP address including a primary number, a secondary number, a third number, and a fourth number;

transmitting a request to the selected IP address;

creating a response record associated with the selected IP address in a response output file, said response record comprising the selected IP address;

incrementing the address to be queried according to a predefined order, the predefined order including:

(a) incrementing the secondary number without changing the primary number, third number, and fourth number until the entire range of secondary numbers has been queried;

(b) incrementing the third number by one;

(c) incrementing the secondary number without changing the primary number, third number, and fourth number until the entire range of secondary numbers has been queried;

(d) repeating steps (b) and (c) until the entire range of secondary numbers and third numbers has been queried;

(e) incrementing the fourth number by one;

(f) incrementing the secondary number without changing the primary number, third number, and fourth number until the entire range of secondary numbers has been queried;

(g) incrementing the third number by one;

(h) incrementing the secondary number without changing the primary number, third number, and fourth number until the entire range of secondary numbers has been queried; and (i) repeating steps (e) through (h) until the entire range of secondary numbers, third numbers, and fourth numbers has been queried;

repeating said steps of transmitting a request, creating a response record, and incrementing the address until every address in the range of addresses has been queried; and initiating a process that examines content at least a first address from which a reply is received.

2. The method of claim 1, wherein the distributed network is the Internet.

3. The method of claim 1, wherein said step of providing a range of addresses to be queried comprises inputting a beginning address only and wherein the ending address is automatically chosen.

4. The method of claim 1, wherein the selected address is the beginning address.

5. The method of claim 1, wherein said request is one of a Hypertext Transfer Protocol ("HTTP") request, a Hypertext Transfer Protocol Secure ("HTTPS") request, a File Transfer Protocol ("FTP") request, a Simple Mail Transfer Protocol ("SMTP") request, a Network News Transfer Protocol ("NNTP") request, a User Datagram Protocol ("UDP") request, and an Internet Chat Relay ("IRC") request.

6. The method of claim 1, wherein said step of creating a response record comprises:

creating a positive response record associated with the selected address in a positive response output file if a reply is received from the selected address in response to the request, said positive response record comprising the selected address; and creating a negative response record associated with the selected address in a negative response output file if no reply is received from the selected address in response to the request, said negative response record comprising the selected address.

7. The method of claim 6, wherein the positive response output file is a table in a database.

8. The method of claim 6, wherein the negative response output file is a table in a database.

9. The method of claim 6, wherein the positive response output file and the negative response output file each comprise tables in a single database.

10. The method of clam 6, wherein the positive response output file is in a format selected from the group consisting of a text file, a Hypertext Markup Language file, a comma separated values file, a database file, a spreadsheet file, and a pdf file.

11. The method of clam 6, wherein the negative response output file is in a format selected from the group consisting of a text file, a Hypertext Markup Language file, a comma separated values file, a database file, a spreadsheet file, and a pdf file.

12. The method of claim 6, further comprising the steps of:

selecting a second address from the negative response output file;

transmitting a second request to the selected second address;

creating a positive response record associated with the selected second address in the positive response output file if a reply is received from the selected second address in response to the second request, said positive response record comprising the selected second address;

removing the negative response record associated with the selected second address from the negative response output file if a reply is received from the selected second address in response to the second request;

incrementing the address to be queried; and repeating said steps of selecting a second address, transmitting a second request, creating a positive response record, removing the negative response record, and incrementing the address until every address in the negative response output file has been queried.

13. The method of claim 6, further comprising the steps of:

selecting a third address from the negative response output file;

transmitting a ping command to the selected third address;

creating a pinged record associated with the selected third address in a pinged output file if a reply is received from the selected third address in response to the ping command, said pinged record comprising the selected third address;

incrementing the address to be searched; and repeating said steps of selecting a third address, transmitting a ping command, creating a pinged record, and incrementing the address until every address in the negative response output file has been queried.

14. The method of claim 13, further comprising the steps of:

selecting a fourth address from the pinged output file;

transmitting a fourth request to the selected fourth address;

creating a positive response record associated with the selected fourth address in the positive response output file if a reply is received from the selected fourth address in response to the fourth request, said positive response record comprising the selected fourth address;

removing the negative response record associated with the selected fourth address from the negative response output file if a reply is received from the selected fourth address in response to the fourth request;

incrementing the address to be searched; and repeating said steps of selecting a fourth address, transmitting a fourth request, creating a positive response record, removing the negative response record, and incrementing the address until every address in the pinged output file has been queried.

15. The method of claim 14, further comprising the step of:

removing the pinged record associated with the selected fourth address from the pinged output file if a reply is received from the selected fourth address in response to the fourth request.

16. The method of claim 1, further comprising the step of:
excluding a specified address from the range of addresses to be searched.

17. The method of claim 1, further comprising the step of:
excluding a specified set of addresses from the range of addresses to be searched.

18. The method of claim 1, further comprising the steps of:

incrementing the primary number by one; and repeating steps (a) through (i) until the entire range of secondary numbers, third numbers, and fourth numbers has been queried.

19. The method of claim 1, wherein said steps of transmitting a request, creating a response record, and incrementing the address are repeated only for a predetermined time, said method further comprising the step of:

discontinuing said step of repeating said steps of transmitting a request, creating a response record, and incrementing the address once the predetermined time has elapsed, regardless of whether every address in the range of addresses has been queried.

20. The method of claim 1, further comprising the steps of:

temporarily halting the querying of computers through operator intervention prior to completion; and resuming the querying of computers through operator intervention at the selected address where the process was temporarily halted.

21. The method of claim 1, further comprising the step of:
operating a plurality of computers remotely to search the range of addresses in tandem.

22. The method of claim 1, further comprising the step of:
filtering addresses listed in the response output file for content based upon user-specified criteria.

23. A method of querying a range of IP addresses, wherein each IP address in the range uniquely identifies a computer connected to a distributed network, wherein the IP address comprises a primary number, a secondary number, a third number, and a fourth number, and wherein the range of IP addresses is queried by transmitting a request to each IP address in the range, said method comprising:

(a) inputting a beginning IP address in the range of IP addresses to be queried;

(b) incrementing the secondary number in the IP address without changing the primary number, third number, or fourth number until the entire range of possible secondary numbers has been queried;

(c) incrementing the third number in the IP address by one;

(d) incrementing the secondary number in the IP address without changing the primary number, third number, and fourth number until the entire range of possible secondary numbers has been queried;

(e) repeating steps (c) and (d) until the entire range of possible secondary numbers and third numbers has been queried;

(f) incrementing the fourth number in the IP address by one;

(g) incrementing the secondary number in the IP address without changing the primary number, third number, and fourth number until the entire range of possible secondary numbers has been queried;

(h) incrementing the third number in the IP address by one;

(i) incrementing the secondary number in the IP address without changing the primary number, third number, and fourth number until the entire range of possible secondary numbers has been queried; and (j) repeating steps (f) through (i) until the entire range of possible secondary numbers, third numbers, and fourth numbers has been queried.

24. The method of claim 23, further comprising the steps of:

incrementing the primary number by one; and repeating steps (a) through (j) until the entire range of secondary numbers, third numbers, and fourth numbers has been queried.

25. The method of claim 23, wherein said request is one of a Hypertext Transfer Protocol ("HTTP") request, a Hypertext Transfer Protocol Secure ("HTTPS") request, a File Transfer Protocol ("FTP") request, a Simple Mail Transfer Protocol ("SMTP") request, a Network News Transfer Protocol ("NNTP") request, a User Datagram Protocol ("UDP") request, and an Internet Chat Relay ("IRC") request.

26. The method of claim 23, wherein at least one of steps (e) and (j) are repeated only for a predetermined time, said method further comprising the step of:

(k) discontinuing at least one of steps (e) and (j) once the predetermined time has elapsed, regardless of whether every IP address in the range of IP addresses has been queried.

27. The method of claim 23, further comprising the steps of:

(k) temporarily halting the querying of IP addresses through operator intervention prior to completion; and (l) resuming the querying of IP addresses through operator intervention at a later time.

* * * * *